United States Patent
Studený et al.

(10) Patent No.: US 10,282,539 B2
(45) Date of Patent: May 7, 2019

(54) AUTHENTICATION AND SECURE COMMUNICATION WITH APPLICATION EXTENSIONS

(71) Applicant: Avast Software s.r.o., Prague (CZ)

(72) Inventors: Pavel Studený, Prague (CZ); Petr Vaněk, Velké Němčice (CZ); Martin Havelka, Benešov (CZ)

(73) Assignee: AVAST SOFTWARE S.R.O., Prague (CZ)

( * ) Notice: Subject to any disclaimer, the term of this patent is extended or adjusted under 35 U.S.C. 154(b) by 185 days.

(21) Appl. No.: 15/179,423

(22) Filed: Jun. 10, 2016

(65) Prior Publication Data

US 2016/0364565 A1 Dec. 15, 2016

Related U.S. Application Data

(60) Provisional application No. 62/175,102, filed on Jun. 12, 2015.

(51) Int. Cl.
*G06F 21/60* (2013.01)
*G06F 21/44* (2013.01)

(52) U.S. Cl.
CPC ............ *G06F 21/44* (2013.01); *G06F 21/602* (2013.01); *G06F 21/606* (2013.01)

(58) Field of Classification Search
CPC ........ G06F 21/44; G06F 21/445; G06F 21/60; G06F 21/602; G06F 21/606
See application file for complete search history.

(56) References Cited

U.S. PATENT DOCUMENTS

| | | | | |
|---|---|---|---|---|
| 8,745,390 | B1* | 6/2014 | Atwood | H04L 63/061 713/169 |
| 9,563,488 | B2* | 2/2017 | Fadel | G06F 9/541 |
| 9,684,547 | B2* | 6/2017 | Krstic | G06F 21/53 |
| 2004/0123154 | A1* | 6/2004 | Lippman | G06F 21/50 726/11 |
| 2007/0204167 | A1* | 8/2007 | Beker | G06F 21/31 713/183 |
| 2014/0177839 | A1* | 6/2014 | Wagner | H04L 9/0822 380/259 |
| 2014/0250505 | A1* | 9/2014 | Kim | H04W 12/08 726/5 |
| 2015/0312256 | A1* | 10/2015 | Seibert, Jr. | H04L 63/0807 726/8 |

(Continued)

OTHER PUBLICATIONS

Mannan et al., Offline shape recognition using flexible DCT grid, Scientia Iranica, 2012, pp. 1722-1730, vol. 19 Issue 6, Sharif University of Technology.

(Continued)

*Primary Examiner* — Khang Do
(74) *Attorney, Agent, or Firm* — Husch Blackwell LLP

(57) ABSTRACT

Systems and methods authenticate with application extensions. An application extension requests a token from a local application. The local application generates a token and either inserts the token into a protected storage accessible only by the application extension being run by the current user or returns the token back to the application extension after being confirmed by the legitimate user. The application extension uses the token to authenticate itself with the local application.

20 Claims, 4 Drawing Sheets

(56) References Cited

U.S. PATENT DOCUMENTS

2015/0347749 A1* 12/2015 Kiehtreiber ............. G06F 21/53
                                                    726/26
2015/0381700 A1* 12/2015 Zhang .................... H04L 67/02
                                                    709/219
2016/0371495 A1* 12/2016 Bhat ....................... G06F 21/53

OTHER PUBLICATIONS

Andrew B. Watson, Image Compression Using the Discrete Cosine Transform, Mathematica Journal, 1994, pp. 81-88, vol. 4 Issue 1.
Christoph Zauner, Implementation and Benchmarking of Perceptual Image Hash Functions, Jul. 2010, 107 Pages, Upper Austria University of Applied Sciences, Hagenberg, Austria.
HackerLabs, Detecting Similar and Identical Images Using Perceptual Hashes, pp. 1-5, http://hackerlabs.github.io/blog/2012/07/30/organizing-photos-with-duplicate-and-similarity-checking/, Accessed Sep. 6, 2016.
The Hacker Factor Blog, Looks Like It, pp. 1-6, https://hackerfactor.com/blog/index.php?/archives/432-looks-like-it.html, Accessed Sep. 8, 2016.
PHash—The open source perceptual hash library, pp. 1-4, http://www.phash.org/, Accessed Sep. 6, 2016.

* cited by examiner

AUTHENTICATION AND SECURE COMMUNICATION WITH APPLICATION EXTENSIONS

CROSS-REFERENCE TO RELATED APPLICATIONS

This Application claims priority to U.S. Provisional Patent Application Ser. No. 62/175,102, filed on Jun. 12, 2015, to Pavel Studený et al., entitled "Authentication and Secure Communication with Application Extensions," the entire disclosure of which is incorporated herein by reference.

FIELD OF THE INVENTION

The disclosure relates generally to application extensions, and more particularly, to application extension authentication.

BACKGROUND OF THE INVENTION

Application extensions provide a convenient way to provide additional capability to an application or to modify existing capability of an application. However, application extensions are often limited in functionality and typically utilize an accompanying local application to provide additional features or capabilities. Communication between an extension and its accompanying application can provide an avenue for attacks. Examples of such attacks can include attacks from different devices than the device running the application and application extensions, attacks by a malicious extension that is controlled by a legitimate application, and attacks by a legitimate extension controlled by an unauthorized user.

SUMMARY OF THE INVENTION

Systems and methods authenticate with application extensions. An application extension requests a token from a local application. The local application generates a token and either inserts the token into a protected storage accessible only by the application extension or lets a user manually verify the token request. The generated token is returned the to the application extension. The application extension saves the token to a protected storage accessible only by the application extension. The protected storage is private for each user of the computer. The application extension uses the token to authenticate communications between the application extension and the local application.

DESCRIPTION OF THE SEVERAL VIEWS OF THE DRAWING

For a better understanding of the inventive subject matter, reference may be made to the accompanying drawings in which.

DETAILED DESCRIPTION OF THE INVENTION

Figure 1:
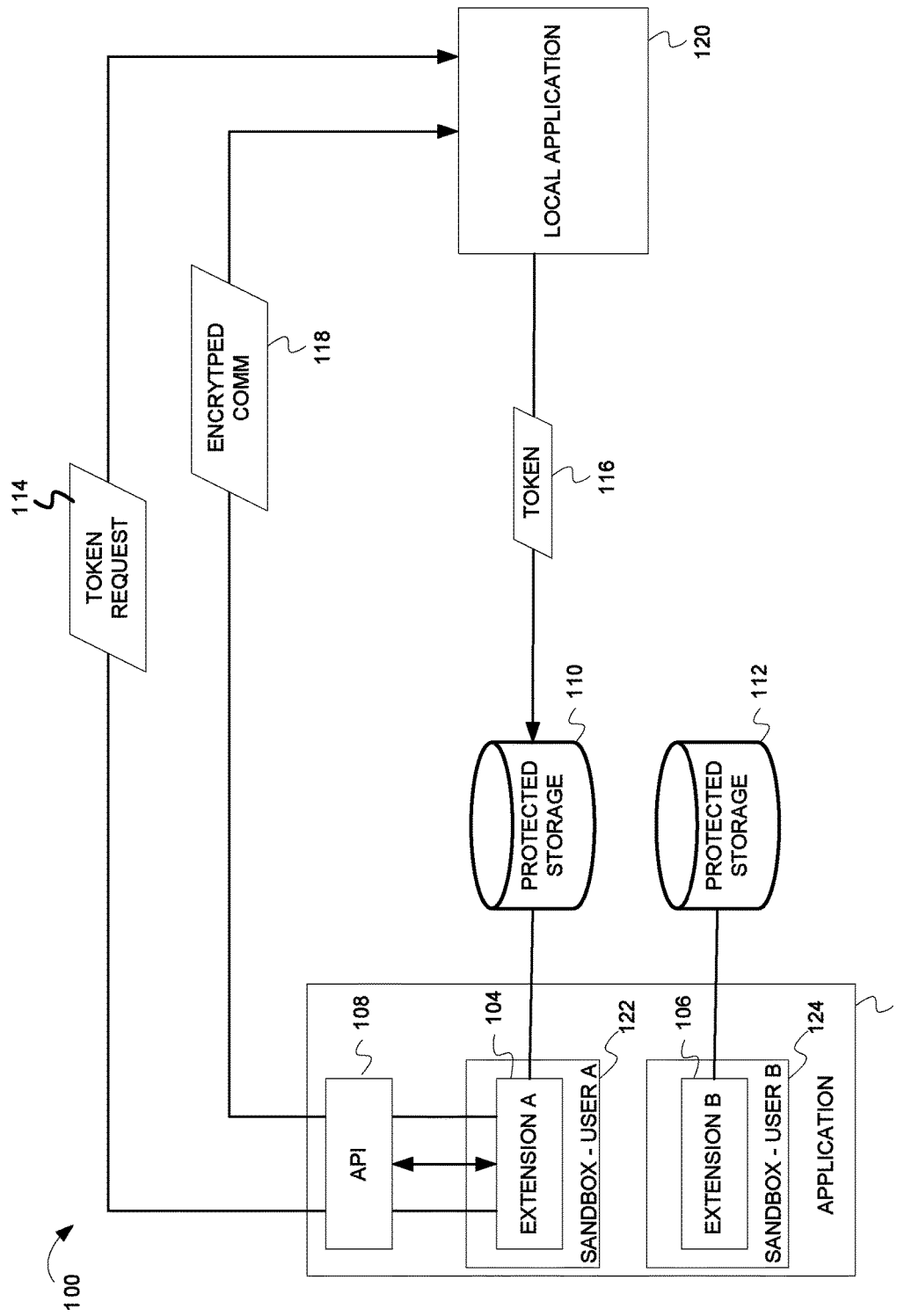
FIG. 1 is a block diagram of an operating environment for a system that authenticates an application extension and provides for secure communication with the application extension.

In the following detailed description of example embodiments of the invention, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be clear from its use in the context of the description. In general, the first digit(s) of the reference number for a given item or part of the invention should correspond to the Figure number in which the item or part is first identified.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

Systems and methods authenticate with application extensions. An application extension requests a token from a local application. The local application generates a token and either inserts the token into a protected storage accessible only by the application extension or lets a user to manually verify the token request and returns the token to the application extension. The application extension saves the token to a protected storage accessible only by the application extension. The protected storage is private for each user of the computer. The application extension uses the token to authenticate communications between the application extension and the local application. Further details on the various embodiments are provided below.

FIG. 1 is a block diagram of an operating environment for a system 100 that authenticates an application extension and provides for secure communication with the application extension. According to some embodiments, system 100 includes an application 102 and a local application 120.

Application 102 can be any type of application that can control and interact with one or more application extensions (e.g., application extension 104 and application extension 106). For example, application 102 can be a web browser application such as GOOGLE® CHROME®, MOZILLA® FIREFOX®, APPLE® SAFARI®, MICROSOFT® EDGE, etc. The embodiments however, are not limited to browsers and other types of applications that support application extensions are within the scope of the inventive subject matter.

An application extension (104, 106) can be a separate part of an application 102 that is controlled by the application 102 and communicates with the application via the application's application program interface (API) 108. The application 102 provides a protected storage to the extension, that other extensions cannot access. In the example illustrated in FIG. 1, application 102 provides protected storage 110 to application extension A 104, and provides protected storage 112 to application extension B 106. Application extension A 104 cannot access protected storage 112, and application extension B 106 cannot access protected storage 110. In some aspects, the protected storage is specific to a particular user and to a particular application extension. Thus, a first user can only access protected storage allocated for the first user and cannot access protected storage allocated for a second user. Further, in some aspects, a protected storage associated with a first application extension of a user cannot access a protected storage associated with a second different application of the same user. For example, there may be two users that each use three application extensions. In some aspects of the disclosure, there can be six protected storages, one for each application extension used by each of the two users.

In some aspects of the disclosure, an application extension (104, 106) runs within a sandbox (122, 124) created by the application 102. In order to access system resources such as memory, disk storage, network resources etc., the application extension (104, 106) must go through API 108. For example, in order to access protected storage 110, application extension 104 must make a call to a function, subroutine, or method provided by API 108. In some aspects, the application 102 can create a sandbox for each user of the application 102. In the example illustrated in FIG. 1, the application 102 has created sandbox 122 for a user "A", and sandbox 124 for a user "B".

Local Application 120 is an application that communicates with another application's extension (e.g., 104 or 106) and is installed on the same machine as the application 102 and application extensions 104 and 106.

Figure 2:
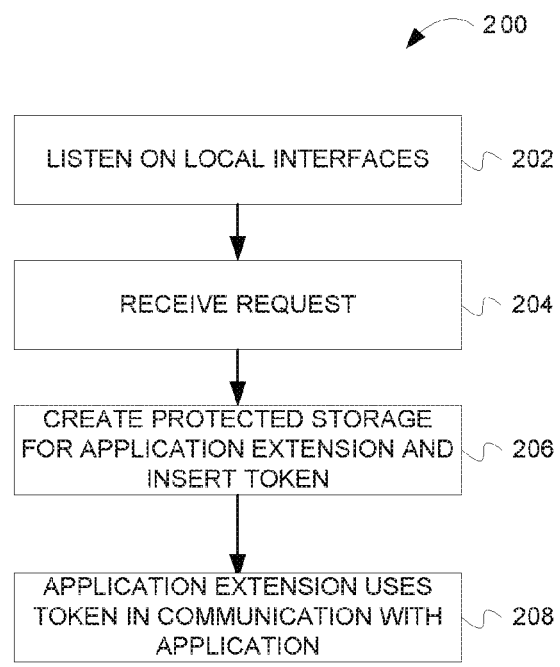
FIG. 2 is a flow chart illustrating operations of a method to authenticate and securely communicate with an application extension.
Figure 3:
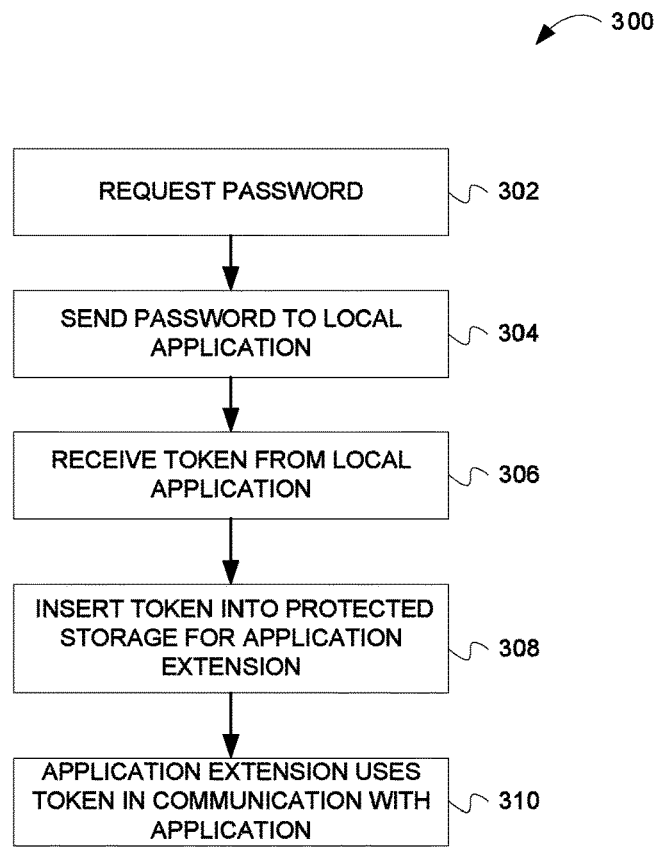
FIG. 3 is a flow chart illustrating operations of a method to authenticate and securely communicate with an application extension utilizing a user password.

Details on the operation of system 100 will now be provided with reference to FIGS. 1-3.

FIG. 2 is a flow chart 200 illustrating operations of a method to authenticate and securely communicate with an application extension.

At block 202, according to some aspects of the disclosure, the local application 120 listens for requests on interfaces that are known to be local to the machine on which the local application 120 is executing. In alternative aspects, the local machine can listen on all interfaces and ignore requests based on the source of the request. For example, the, local application can choose to ignore requests that do not originate on the local machine (i.e., the computing system on which the local application 120 is executing).

At block 204, a local application 120 receives a request 114 for a token from an application extension (e.g., application extension 104).

At block 206, in response to receiving a request, the local application 120 creates a file or a record in a protected application extension storage. The local application 120 creates a token 116 and places the token in the file or record. For example, in implementations where Google Chrome is the application 102, application extension data is stored in database files. Application extensions are sandboxed and thus limited to accessing their extension data utilizing API calls provided by Google Chrome to access the database. However, the local application 120 is not sandboxed and can access the database directly using an embedded database engine to modify the protected storage associated with an application extension.

In some aspects, the token can be a random number generated by a pseudo-random number generator. In alternative aspects, the token can be an identifier of a resource that the local application uses. A token can be generated on a per user and per application extension. Thus in the example illustrated above, two users each having three application extensions would result in the generation and allocation of six separate tokens.

At block 208, the application extension can read the token from the file in its associated protected storage, and use the token to authenticate itself with the local application. The token can be used to establish an encrypted communication session with the local application 120.

FIG. 3 is a flow chart 300 illustrating operations of a method to authenticate and securely communicate with an application extension utilizing a user password. The operations illustrated in FIG. 3 may be used as an alternative to some or all of the operations illustrated in FIG. 2.

At block 302, an application extension issues a request for a password. For example, the application extension may present user interface elements that request that a user provide a password, and user interface elements for a user to enter a password.

At block 304, the application extension sends the password to the local application. The local application can verify the password. In response to verifying the password, the local application can send a token to the application extension.

At block 306, the application extension receives the token created by the local application.

At block 308, the application extension can save the token into its protected storage.

At block 310, the application extension can use the token to authenticate itself with the local application. The token can be used to establish an encrypted communication session with the local application 120.

As can be seen from the above, the embodiments can provide protection from various forms of attacks. For example, some embodiments protect from attacks from remote machines because the method ignores such requests or doesn't listen on interfaces designed for remote communication.

Some embodiments protect from attacks from malicious application extensions, because such extensions don't have access to the token, and thus cannot authenticate itself.

Some embodiments protect from users gaining access to other user's local application resources, because they don't have access to each other's tokens.

Figure 4:
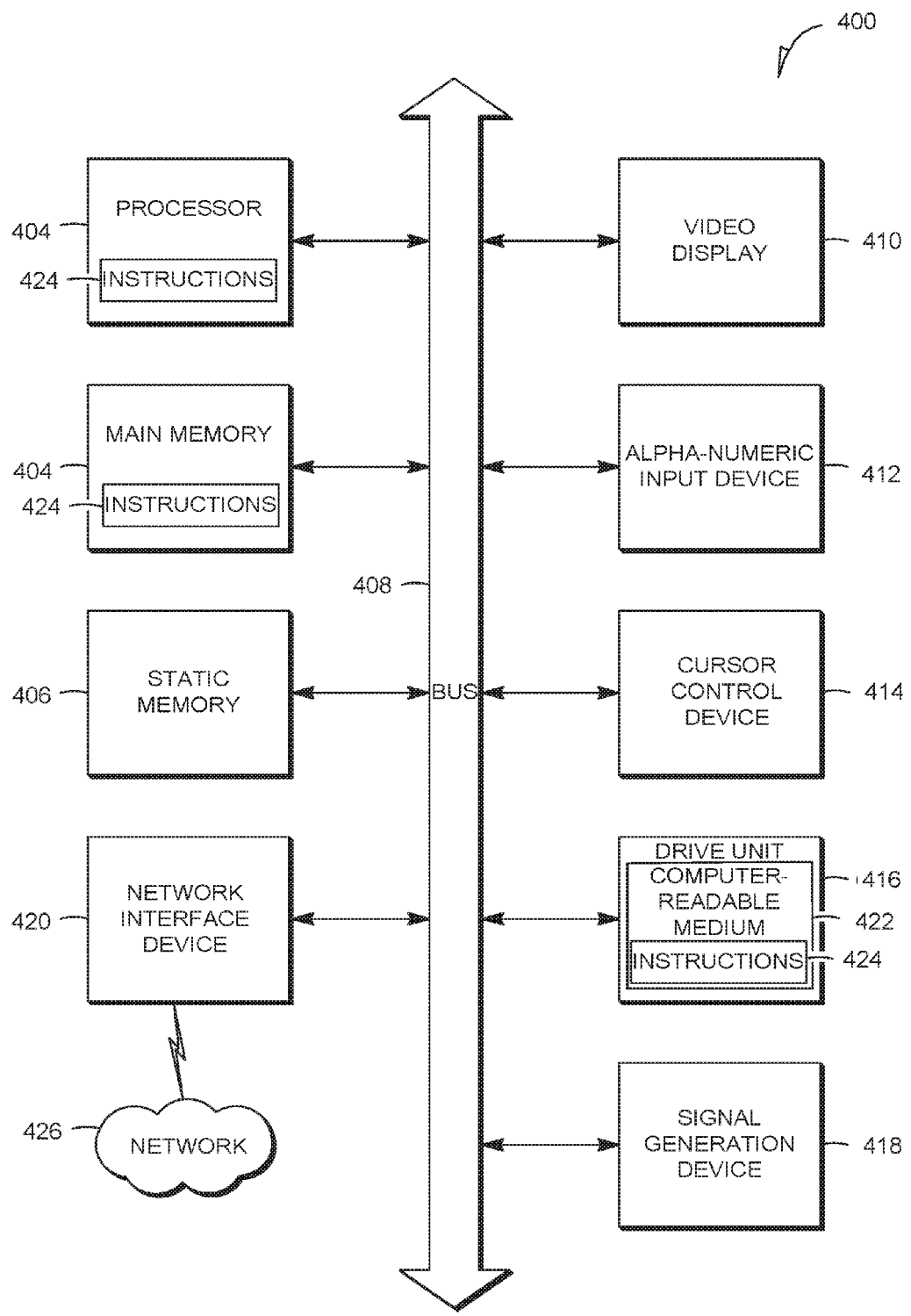
FIG. 4 is a block diagram of an example embodiment of a computer system upon which embodiments of the inventive subject matter can execute.

FIG. 4 is a block diagram of an example embodiment of a computer system 400 upon which embodiments of the inventive subject matter can execute. The description of FIG. 4 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

As noted above, the system as disclosed herein can be spread across many physical hosts. Therefore, many systems and sub-systems of FIG. 4 can be involved in implementing the inventive subject matter disclosed herein.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. Embodiments of the invention may also be practiced in distributed computer environments where tasks are performed by I/O remote processing devices that are linked through a communications network. In a distributed computing environment, program modules may be located in both local and remote memory storage devices.

With reference to FIG. 4, an example embodiment extends to a machine in the example form of a computer system 400 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 400 may include a processor 402 (e.g., a central processing unit (CPU), a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). In example embodiments, the computer system 400 also includes one or more of an alpha-numeric input device 412 (e.g., a keyboard), a user interface (UI) navigation device or cursor control device 414 (e.g., a mouse), a disk drive unit 416, a signal generation device 418 (e.g., a speaker), and a network interface device 420.

The disk drive unit 416 includes a machine-readable medium 422 on which is stored one or more sets of instructions 424 and data structures (e.g., software instructions) embodying or used by any one or more of the methodologies or functions described herein. The instructions 424 may also reside, completely or at least partially, within the main memory 404 or within the processor 402 during execution thereof by the computer system 400, the main memory 404 and the processor 402 also constituting machine-readable media.

While the machine-readable medium 422 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 424 may further be transmitted or received over a communications network 426 using a signal transmission medium via the network interface device 420 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A method comprising:
creating, by a local application, a user-specific protected storage associated with an application extension, wherein the local application is configured to directly access the user-specific protected storage of the application extension and one or more user-specific protected storages associated with one or more other application extensions, and wherein the application extension is limited to accessing the user-specific protected storage via an application program interface (API) provided by the local application;
receiving, by the local application, a token request from the application extension; and
in response to receiving the token request, inserting, by the local application, a token into the user-specific protected storage associated with the application extension, wherein the application extension and the local application utilize the token to authenticate communications between the application extension and the local application.

2. The method of claim 1, wherein said inserting a token comprises at least one of (i) inserting an identifier associated with at least one of data and a system resource used by the local application, (ii) inserting a randomly generated number, (iii) inserting a token that is usable only by said application extension and not by other application extensions, and (iv) inserting a token that is associated with a user of said local application.

3. The method of claim 1, wherein said method further comprises:
listening, by the local application, for the token request using a network interface; and
in response to determining that the token request did not originate from a local machine executing the local application, ignoring the token request.

4. The method of claim 1, wherein said inserting a token into a user-specific protected storage associated with an application extension comprises inserting the token into one or more database records in a database.

5. The method of claim 1, wherein inserting a token into a user-specific protected storage associated with an application extension comprises inserting a token into at least one of (i) a part of a file and (ii) one or more files in a file system.

6. The method of claim 1, further comprising:
issuing, by the application extension, a request for a password;
receiving the password; and
sending, by the application extension, the password to the local application;
wherein the local application inserts the token into the user-specific protected storage associated with the application extension in response to validating the password.

7. The method of claim 1 further comprising creating, by said local application, a sandbox in which said application extension runs.

8. The method of claim 1 wherein said local application comprises a web browser and wherein said receiving, by a local application, a token request comprises receiving by the web browser the token request.

9. A method comprising:
creating, by a local application, a user-specific protected storage associated with an application extension, wherein the local application is configured to directly access the user-specific protected storage of the application extension and one or more user-specific protected storages associated with one or more other application extensions, and wherein the application extension is limited to accessing the user-specific protected storage via an application program interface (API) provided by the local application;
receiving, by the local application, a token request from the application extension; and
in response to receiving the token request, verifying the token request by a user confirmation and returning a token to the application extension, wherein the application extension and the local application utilize the token to authenticate communications between the application extension and the local application.

10. The method of claim 9, wherein said returning the token comprises at least one of (i) returning an identifier associated with at least one of data and a system resource used by the local application, (ii) returning a randomly generated number, (iii) returning a token that is usable only by said application extension and not by other application extensions, and (iv) inserting a token that is associated with a user of said local application.

11. The method of claim 9, wherein said method further comprises:
listening, by the local application, for the token request using a network interface; and
in response to determining that the token request did not originate from a local machine executing the local application, ignoring the token request.

12. The method of claim 9, wherein the user confirmation comprises a password, said method further comprising:
issuing, by the application extension, a request for the password;
receiving the password; and
sending, by the application extension, the password to the local application.

13. The method of claim 9 further comprising creating, by said local application, a sandbox in which said application extension runs.

14. The method of claim 9 wherein said local application comprises a web browser and wherein said receiving, by a local application, a token request comprises receiving by the web browser the token request.

15. A non-transitory computer readable storage medium having stored thereon a local application, said local application comprising a set of instructions executable by a computer, the non-transitory computer readable storage medium comprising:
instructions for creating, by the local application, a user-specific protected storage associated with an application extension, wherein the local application is configured to directly access the user-specific protected storage of the application extension and one or more user-specific protected storages associated with one or more other application extensions, and wherein the application extension is limited to accessing the user-specific protected storage via an application program interface (API) provided by the local application;
instructions for receiving, by the local application, a token request;
instructions for, in response to receiving the token request, performing at least one of:
inserting a token into the user-specific protected storage associated with the application extension; and
verifying the token request by a user confirmation and returning a token to the application extension; and
instructions for authenticating communications between the application extension and the local application utilizing the token.

16. The non-transitory computer readable storage medium of claim 15, wherein said instructions for inserting a token comprise at least one of (i) instructions for inserting an identifier associated with at least one of data and a system resource used by the local application, (ii) instructions for inserting a randomly generated number, (iii) instructions for inserting a token that is usable only by said application extension and not by other application extensions, and (iv) instructions for inserting a token that is associated with a user of said local application.

17. The non-transitory computer readable storage medium of claim 15, further comprising instructions for:
listening, by the local application, for the token request using a network interface; and
in response to determining that the token request did not originate from the computer executing the local application, ignoring the token request.

18. The non-transitory computer readable storage medium of claim 15, wherein the user confirmation comprises a password, said non-transitory computer readable storage medium further comprising:
instructions for issuing, by the application extension, a request for the password;
instructions for receiving the password; and
instructions for sending, by the application extension, the password to the local application.

19. The non-transitory computer readable storage medium of claim 15 further comprising instructions for creating, by said local application, a sandbox in which said application extension runs.

20. A device comprising:
a computer having an electronic processor and a memory;
a local application stored in said memory of said computer; and
wherein said electronic processor is configured to:
create, by the local application, a user-specific protected storage associated with an application extension, wherein the local application is configured to directly access the user-specific protected storage of the application extension and one or more user-specific protected storages associated with one or more other application extensions, and wherein the application extension is limited to accessing the user-specific protected storage via an application program interface (API) provided by the local application;
receive, by the local application, a token request;
perform, in response to receiving the token request, at least one of:
insert a token into the user-specific protected storage associated with the application extension; and
verify the token request by a user confirmation and return a token to the application extension, wherein the application extension and the local application utilize the token to authenticate communications between the application extension and the local application.

* * * * *